United States Patent [19]

Winters et al.

[11] 4,444,803

[45] Apr. 24, 1984

[54] WATER-BORNE SOFT COATING COMPOSITIONS AND PROCESSES THEREFOR

[75] Inventors: Jonathan K. Winters, Portsmouth, Ohio; Fred B. Savell, III, Mobile, Ala.

[73] Assignee: Ashland Oil, Inc., Ashland, Ky.

[21] Appl. No.: 374,466

[22] Filed: May 3, 1982

[51] Int. Cl.$^3$ .......................... B05D 1/28; B05D 1/08; C04B 9/02

[52] U.S. Cl. .................... 427/27; 106/14.18; 106/14.34; 106/14.13; 106/14.15; 427/428; 427/429; 427/435; 428/467

[58] Field of Search .................... 106/14.35, 271, 10.1, 106/14.11–14.34; 428/467; 427/27, 428, 429, 435

[56] References Cited

U.S. PATENT DOCUMENTS

| | | | |
|---|---|---|---|
| 2,598,666 | 6/1952 | Sesso et al. | 106/10 |
| 2,677,618 | 5/1954 | Dedman et al. | 106/14.13 |
| 2,882,171 | 4/1959 | Denman | 106/14.13 |
| 2,911,309 | 11/1959 | Rudel | 106/14.27 |
| 3,086,870 | 4/1963 | Sheldahl | 106/14.27 |
| 3,132,055 | 5/1964 | Tanaka | 148/6.16 |
| 3,175,964 | 3/1965 | Watanabe | 204/37 |
| 3,248,350 | 4/1966 | Triggle | 260/17 |
| 3,711,420 | 1/1973 | Jones | 106/14.24 |
| 4,315,957 | 2/1982 | Hereth | 106/271 |
| 4,360,385 | 11/1982 | Grunewalder | 106/2 |

FOREIGN PATENT DOCUMENTS 519462  8/1976  U.S.S.R. .................... 106/10

*Primary Examiner*—Theodore Morris
*Attorney, Agent, or Firm*—Richard C. Willson, Jr.; Mary L. Beall

[57] ABSTRACT

Water reducible, dispersible, corrosion resistant coating compositions comprising organic vehicle containing wax compounds, organic esters, carboxylic acid, amines, alcohol coupling agent and water and methods for their manufacture are disclosed and demonstrated to be useful for protecting metals, e.g. ferrous alloys, from corrosion.

36 Claims, No Drawings

WATER-BORNE SOFT COATING COMPOSITIONS AND PROCESSES THEREFOR

CROSS REFERENCES TO RELATED APPLICATIONS

The present application discloses compositions and techniques related to those of U.S. patent application Ser. No. 374,467 filed May 3, 1982 and also to U.S. patent application Ser. No. 382,853 filed May 24, 1982, and also to U.S. patent application Ser. No. 374,465 filed May 3, 1982.

BACKGROUND OF THE INVENTION

1. Field of the Invention

The present invention relates particularly to organic coating compositions and methods for their use generally classified in Class 106, particularly in Subclasses 14.11, 14.13, 14.15, 14.16, 14.34, 14.35, 14.37, 14.38, 270, 271 and 272.

2. Description of the Prior Art

U.S. Pat. No. 3,539,367 to Yaroshevich, et al discloses a wax emulsion containing a salt of an organic acid and an amine. U.S. Pat. No. 3,660,128 to Sheldahl teaches an alkanolamine and an aliphatic carboxylic acid in the preparation of a semi-solid wax-in-water emulsion. U.S. Pat. No. 2,349,326 to Wilson teaches a combination of morpholine and a fatty acid to emulsify waxy materials in water for paste-type waxes. U.S. Pat. No. 3,125,453 to Simmonds employs a mixture of triethanolamine and an acid to emulsify a mixture of waxes also for paste-type polishes.

U.S. Pat. No. 4,035,514 to Davis, teaches a water-dispersable petrolatum composition containing cetyl alcohol, lanolin alcohols and alkoxylate fatty acid esters of sorbitol.

Most of the above teach production of temporary coatings such as floor waxes, cosmetics and the like. In contrast, the present invention, possibly through the use of co-solvents which tend to form azeotropes which enhance water removal during curing, provides coatings having substantial life even in corrosive environments. While not wishing to be bound to any theory or mechanism, it appears the co-solvents tend to act as dispersing agents and additionally enhance stability of the liquid compositions at low temperatures.

Also, the inclusion of the salts of organic acids in the present invention tend to build longer-chain molecules which additionally deter corrosion and promote stability.

The coatings of the present invention find additional utility as lubricants, e.g. particularly for wire drawing and other metal drawing, extrusion and impact forming operations.

In brief review, other prior U.S. patents of interest include:

U.S. Pat. No. 3,539,367 to Yaroshevich, relating to cationic emulsions (the compositions of the present invention are not cationic emulsions);

U.S. Pat. No. 3,660,128 to Sheldahl, relating to inverted wax emulsion pastes for artwork;

U.S. Pat. Nos. 2,349,326 to Wilson and 3,125,453 to Simonds, both relating to paste type polishes;

U.S. Pat. Nos. 2,862,825 to Westlund et al, 2,943,945 to Saywell, and 3,565,843 to Kassinger, all relating to soluble oils, not to firm wax coatings;

U.S. Pat. No. 3,434,851 to Miller, relating to solvent-borne asphalt coatings;

U.S. Pat. Nos. 3,446,764 to Phillips, 3,699,065 to Clark, 4,184,991 to Scheurman III, 3,223,666 to Botton, 3,379,548 to Jen, 4,039,495 to Hunsucker, 4,051,089 to Tobias, and 4,081,411 to Hunsucker, all relating to base resin formulas not to completed coatings;

U.S. Pat. No. 3,494,882 to Andrews, relating to high gloss emulsified polyester emulsions;

U.S. Pat. No. 4,187,204 to Howard, relating to water-borne paint containing not over 10% water;

U.S. Pat. No. 4,225,477 to Vosishth and Wang, relating to co-solvent changes in water-borne coatings to control re-coatability (the coating's ability to form a substrate for a topcoat);

U.S. Pat. No. 4,148,948 to Williams, relating to a leveling additive for water dispersible paints; and, U.S. Pat. No. 3,413,227 to Howard and Randell, relating to substituted benzotriazole.

Other patents considered in preparing this application are:

U.S. Pat. No. 3,879,335, Storck, et al
U.S. Pat. No. 2,695,910, Asseff, P. A., et al
U.S. Pat. No. 3,565,678, Johnson, et al
U.S. Pat. No. 4,239,648, Marshall, et al
U.S. Pat. No. 4,059,452, Nishijima, et al
U.S. Pat. No. 3,653,931, Burchart, et al
U.S. Pat. No. 3,985,584, Chan, et al
U.S. Pat. No. 4,048,374, Kotzach, et al
U.S. Pat. No. 3,839,051, Carreny, L.
U.S. Pat. No. 3,903,346, Delcon, et al
U.S. Pat. No. 3,864,322, Yalloorakis, M. D.
U.S. Pat. No. 4,062,821, Hung, T. M.
U.S. Pat. No. 3,773,550, Tomalia, D. A.
U.S. Pat. No. 4,035,514, Davis, R. I.
U.S. Pat. No. 4,162,920, Gillich, T. N.
U.S. Pat. No. 3,661,796, Erby, et al
U.S. Pat. No. 3,313,635, Wollak, et al
U.S. Pat. No. 3,080,221, Fessler, et al
U.S. Pat. No. 3,738,851, Jarvis, W. H.
U.S. Pat. No. 3,726,807, Johnson, K. L.
U.S. Pat. No. 3,642,653, Northan et al.

Problems with metal preservative coatings, especially those primarily intended for long-term storage protection, have always existed. Prominent difficulties have been tackiness, poor water removability, sensitivity to water, objectionable odor, non-availability of light colored coatings and, where water-borne compositions are involved, limited high-temperature storage stability of the compositions themselves.

Many attempts have been made to modify so-called "cosmoline" type coatings to enhance their water removability, and reduce their water sensitivity (fogging, clouding, stripping in the presence of water) problems and tackiness without achieving the results of the present invention. Fatty emulsions, abetic acid and similar acid soaps can enhance water removability (removability of the coating by hot water), but result in coatings of poor corrosion performance and, additionally, after many months, hardening may occur causing localized corrosion of the article to be preserved.

The coating compositions of the present invention are water-borne, storage stable, even at higher temperatures, and provide coatings which usually are semi-firm but non-tacky, which can be light in color, which have low odor levels, which display enhanced corrosion prevention and which can be formulated to be readily removable in hot (e.g. 60° C.+) water.

SUMMARY

(1) General Statement of the Invention:

The present invention relates to water-borne coating compositions of high temperature (e.g. 52° C.) storage stability which, when applied to a substrate, usually form a soft but non-tacky, flexible, hot water removable, low odor, lubricating, corrosion preventative film capable of being formulated in light colors.

More particularly, the coating compositions of the present invention, which are capable of application and flow onto a solid substrate, and comprise: (1) usually one or more waxes, (2) one or more organic esters, (3) one or more surfactants, (4) one or more coupling agents many of which are carefully selected to result in final dispersion stable at higher temperatures and (5) water; to form a water-borne dispersion for greatly improved corrosion resistance, especially when employed as a long-term metal preservative.

(2) Utility of the Invention:

The invention provides valuable coating formulations having excellent corrosion protection and storage stability.

DESCRIPTION OF THE PREFERRED EMBODIMENTS STARTING MATERIALS

Waxes:

Preferably the compositions of the present invention will include semirefined paraffin wax having a melting point of below about 60° C. and preferably 50° C. which contains about 10 to about 50 and more preferably 15 to about 35 weight percent oil based on the weight of the paraffin wax though other types of wax may occasionally be substituted for specialized applications. General paraffin waxes can be naturally derived, e.g. those manufactured in the processing of petroleum crude oils, or synthetically manufactured, e.g. polyolefin waxes such as polyethylene or polypropylene waxes. The average molecular weight of the waxes useful in the present invention should be selected so as to provide good removability, but molecular weight is not narrowly critical and will be easily selected by those skilled in the art. Also, the degree of branching in the wax molecules should be selected so the average degree of crystallinity permits the wax to be easily dispersed and to be compatable with the other ingredients of the particular formulation being produced. Chain branching provides sites for esterification in the case of oxygenated waxes; these are also suitable for use in most applications with the present invention. Oxygenated waxes will preferably have an acid number in the range of from about 15 to about 200, most preferably from 25 to about 45.

The wax composition can contain 10 to 50, more preferably 15 to 35 and most preferably 20 to 30% of a hydrocarbon oil, preferably saturated and boiling at a temperature above 177° C. Specific waxes useful for the present invention include: natural waxes, such as slack wax, a semirefined paraffin available from Penreco Co. of Butler, Pa.; petrolatum, widely available; synthetic waxes, such as polyethylene waxes available from Bareco Corporation of Tulsa, Okla. or the Epolene brand available from Eastman Kodak of Rochester, N.Y. or oxygenated waxes, such as oxidized petrolatum which can be readily manufactured in petroleum refineries utilizing well-known techniques. Also useful are those available from Durachem Corporation of Harrison, N.Y. Others include: Polywax 55 (Bareco) and Mobil Microwax 2305 (Mobil Oil).

The amount of waxes to be utilized with the present invention is not narrowly critical and, in fact, for special applications the wax can even be omitted with additional quantities of the esters described below being employed. For most formulations the wax content will be from 0.5 to 30%, more preferably from about 5 to 25% and most preferably from about 12 to about 20% by weight.

All percents given herein are percents by weight based on the weight of the total formulation unless otherwise expressly stated.

Polyol Esters:

The esters useful for the present invention are preferably polyfunctional esters of carboxylic acids, preferably of fatty acids having 6 to 30 carbons. Mono-esters may find occasional use in special circumstances. Particularly preferred are the polyesters of naturally-derived fatty acids such as organic acid esters of glycerine, coconut oil, tall oil, soya oil acids, stearic acid, preferably, isostearic acid, oleic acid, and polyols, e.g. neopentylglycol, trimethylol propane and pentaerythrol. Most preferred is the dilanolinic acid ester of pentaerythritol.

Useful commercial polyol esters comprise: "Pentalan" from Croda Chemical Company of England, a tetrahydric lanolin alcohol; Degras manufactured by Emory Industries of Linden, N.J. and FAI manufactured by Arizona Chemical of New York City.

Table I illustrates the starting materials for a number of suitable esters.

In all four cases the PE used was in a 1:4 molar ratio to the fatty acid content of the charge and the water collected is essentially equivalent to theory on the basis of PE weight. (A slightly greater amount of water is obtained where oxwax is involved).

Ester I

75% 100 Oxwax 91
25% Lanolin FA-147

Ester II

50% 100 Oxwax 91
50% Lanolin FA-147

Ester III

100% 100 Oxwax 91

Ester IV

100% Lanolin FA-147

Esters II and II have small amounts of insoluble resins—these were filtered out.

Adjustment of residual acid number for esters up to 25 is made with oxwax.

TABLE I

GLYCEROL AND PENTAERYTHRITOL ESTERS OF 100 NEUTRAL OXYGENATED WAX (93 ACID NO.)

| Charge (g): | GE-I | GE-II | GE-III | PE-I | PE-II | PE-III | PE-IV |
|---|---|---|---|---|---|---|---|
| Toluene | 200.1 | 200.0 | 200.1 | 200.4 | 200.4 | 200.1 | 200.2 |
| 100 Oxwax 91 | 150.1 | 100.0 | 200.1 | 150.3 | 100.2 | 200.1 | 00 |

TABLE I-continued
GLYCEROL AND PENTAERYTHRITOL ESTERS OF 100 NEUTRAL OXYGENATED WAX (93 ACID NO.)

| Charge (g): | GE-I | GE-II | GE-III | PE-I | PE-II | PE-III | PE-IV |
|---|---|---|---|---|---|---|---|
| Lanolin FA 147 | 50.0 | 100.0 | 00 | 50.1 | 100.2 | 00 | 20.2 |
| Glucerol | 10.0 | 20.0 | 31.5 | 00 | 00 | 00 | 00 |
| Pentaerithritol | 00 | 00 | 00 | 11.0 | 22.0 | 33.0 | 44.0 |
| para-Toluene Sulfonic Acid-Catalyst | 1.0 | 2.0 | 3.1 | 1.0 | 2.0 | 3.0 | 3.9 |
| Total | 411.2 | 422.0 | 434.8 | 412.8 | 424.7 | 436.1 | 448.3 |
| $H_2O$/Azeotrope (g) | 6.0+ | 9.5+ | 12.0 | 5.5 | 8.0 | 12.7 | 13.2 |
| Toluene-320° | *— | *— | 161.1 | 163.7 | 174.3 | 166.6 | 171.0 |
| Product | 233.7 | 238.8 | 259.6 | 240.2 | 243.5 | 251.6 | 254.7 |
| Residues | 0.4 | 1.3 | 2.2 | 0 | 61 | 5.4 | 10.0 |
| Total Product | — | — | 434.9 | 409.4 | 425.8 | 436.3 | 448.9 |
| Acid No. | 33.4 | 14.6 | 9.2 | 26.8 | 12.5 | 22.1 | 12.3 |
| Saponification No. | 197 | 170 | 150 | 174 | 167 | 202 | 174 |
| Wt % Yield | 56.8 | 56.5 | 59.7 | 58.2 | 57.3 | 57.1 | 56.8 |
| Wt % Toluene in Prod. | — | — | 15.0 | 15.1 | 10.7 | 13.3 | 11.5 |

*Lost condenser water

The quantity of esters employed with the present invention will not be narrowly critical and will depend to a substantial degree on the other ingredients and their amounts as selected for the particular formulation. Preferably the compositions will contain from about 1% to about 30%, more preferably from about 5% to about 10% and most preferably from about 8% to about 12% percent esters based on the total weight of the esters as compared to the total weight of the formulation.

Surfactants:

Surfactants useful with the present invention include natural surfactants such as salts of oleic acid, e.g. morpholine salts of oleic acid, or the similar salt of triethanolamine and entirely synthetic surfactants such as alkanol amide, e.g. WHC by Stepan Chemical Company of Chicago, Illinois (oleyl diethanol amide), sorbitan mono-oleates manufactured by ICI America of Wilmington, Delaware, isostearic acid salts, coconut oil salts, lauric acid salts and the like. Excess carboxylic acid, e.g. in the wax components, can react with amines in situ to form salts which act as surfactants. The preferred range is 2 to 8% carboxcylic acid and 1 to 5% amine. All or part of the surfactant can be organic sulfonates, e.g. alkyl lauryl sulfonate or alkyl benzene sulfonates.

Suitable surfactants comprise the reaction products of amines such as morpholine, triethanolamine, ammonia, diethanolamine and triethanolamine with carboxylic acids such as those mentioned above. The compositions of the present invention will generally include surfactants in the amount of from about 0.5 to about 6, more preferably from about 3 to about 5 and most preferably from about 3 to about 4 percent by weight based on the weight of the formulation. However, this will vary in response to the selection and quantities of the other ingredients employed.

Coupling Agents:

The use of the coupling agents is a special feature of the invention.

Several types of coupling agents can be employed with the invention including mineral spirits, e.g. ethylene glycol ethers, preferably propyl and propyl ethers; hydroxy ethers (ether-alcohols), such as butyl cellosolve, (Ektasolve EP manufactured by Eastman Kodak of Rochester, N.Y.), sorbitan (mono-ester of sorbitol) diethylene glycol monoethyl ether, monopropyl ether, of ethylene glycol, propyl cellosolve, ethyl cellosolve, and diethylene glycol monoethyl ether, and other coupling agents which will be evident to those skilled in the art for use in specialized formulations according to the present invention. The coupling agent is selected by physical test; anything which does not interfere with the formulations of the present invention and which renders their ingredients mutually soluble in the water base will generally be acceptable.

Alcohol ether-esters may also be used e.g. ethylene glycol monoacetate, diethylene glycol monopropionate, diethylene glycol monoacetate, and propylene glycol monoacetate.

Alcohols, such as ethanol, isopropanol and isobutanol will generally be useful as coupling agents for the invention. Other commercial coupling agents which are useful with formulations of the present invention include: Ektasolve EP, manufactured by Eastman Kodak of New York, and Propasol P, manufactured by Union Carbide of Danbury, Conn.

The coupling agents of the present invention will generally be employed in quantities of from about 1% to about 15% or more, more preferably from about 3 to about 12%, and most preferably from about 4 to about 10% based on the weight of the formulation. In addition to acting as a coupling compound, the coupling agent will usually be useful during the drying and curing process after application of the coatings composition of the present invention to substrates. For example, when carefully selected, the coupling agent will form an azeotrope with the water present in the formulation, thus increasing volatility, speeding cure, and providing a more permanent coating. Some coupling agents will assist the final coating in other ways, e.g. by providing leveling of the final coating, avoiding pinholes and providing a more continuous, better quality dry film.

Water:

Deionized water will preferably be employed with the formulations of the present invention in order to prevent reaction of chlorine, calcium, magnesium or other components of tap water from interfering with the formulations or their curing. Distilled water could, of course, be employed but will generally be avoided for economic reasons.

Formulations of the present invention will generally contain a minimum of about 45%, more preferably 50% and most preferably 60% or even more of water based on the total weight of the formulation. As the formulations of the present invention are generally classifiable as oil-in-water emulsions of special character, a quantity of water greater than about 92% may cause swelling and loss of wetting properties in most of the formulations of the present invention although specialized formulations utilizing carefully selected non-aqueous ingredients may tolerate water up to an amount of 97% by weight based on the weight of the total formulation.

pH:

The pH of this system will be preferably in the range of 7.0–10 with 8.0–9.0 being preferred. The nature of the emulsion will depend heavily upon the amount of soap produced when the emulsifying agent (fatty acid) is neutralized with an alkaline material (e.g. amines, triethanolamine, morpholine). One should slightly overbase (make alkaline) the system to obtain maximum soap production by reacting any residual acids which may be left over at the normal end point of titration. Excessive amounts of base will form an extremely "hard" salt which is not miscible in water, thus causing the aqueous and non-aqueous phases to separate.

HLB:

Hydrophile-lipophile balance—In the selection of amides for this system one should obtain an amide with an HLB value of about 8 to 12, preferably 9 to 11 to facilitate making an oil in water emulsion. An anionic surfactant would be preferred due to its better corrosion inhibiting properties.

Techniques in Mixing:

Apparatus: The apparatus for the present invention will be that conventionally utilized in the preparation of coatings compositions, e.g. kettles and mixing tanks having flow metering or measuring devices and agitation means, e.g. pumps mounted on side-arms connecting with the main vessel, internal stirrers, contra-rotating shearing devices and any of the other available devices which are well known to the art.

Temperature: The temperature during mixing may be diffeerent during different stages in the formulation. In general the water will be at about 200° F. (93° C.), the non-aqueous ingredients will be transferred and mixed together at about 225° F. (107° C.). However, these temperatures are not narrowly critical and will vary to provide faster mixing or better compatability of ingredients according to observation of those skilled in the art. For example, pressure vessels may be utilized for the purpose of lowering ingredient melting and boiling points, where useful, in order to provide better dispersion of difficult-to-mix ingredients.

Mixing Procedure: While the formulations of the present invention may be manufactured continuously if desired, batch techniques will be more usually employed. For example, the total amount of water desired in the finished formulatiion (e.g. 1700 gallons, 6,562 liters) is heated in a mixing vessel large enough to hold the entire batch of formulation until the water temperature is approximately 195° F. (90° C.). The wax, if any, esters, surfactants, coupling agents and any other non-aqueous ingredients are heated in a separate vessel until the temperature reaches about 225° F. (107° C.) with the various non-aqueous ingredients being added slowly while the vessel is agitated with conventional mixer. In most cases, the esters will be added with the carboxylic acids; the neutralizing ingredient, e.g. morpholine, triethanolamine, will be added after the other ingredients have been thoroughly mixed. After neutralization, which is generally visually observable as a distinct increase in viscosity, the non-aqueous ingredients are allowed to mix for 15 to 30 minutes and transferred over the aqueous phase, which is agitated during the addition of the non-aqueous phase. Heating is discontinued after addition of the non-aqueous phase, and the finished formulation is allowed to cool with, preferably, constant agitation, after which the formulation is drawn off into shipping containers, e.g. tank cars, tank trucks, drums or smaller cans.

Quality Control:

The finished formulation, prior to packaging, will generally be checked for pH, solids content, freeze-thaw stability, corrosion-protection under accelerated conditions and other tests utilizing techniques well known to the coatings industry.

Application:

The formulations of the present invention may be applied to substrates to be protected by conventional application techniques, such as spraying, brushing, roller-coating, dipping, flow-coating, electrostatic airless spraying. Coating thickness can be varied by changing the formulation, the number of coats, or the amount applied per coat but in general will be in the range from about 0.5 to about 3 mils per coat after drying.

EXAMPLES

EXAMPLE I (Formulation according to the invention providing long term protection)

Sixty parts by weight of deionized water are charged to a conventional mixing kettle rotary agitator and brought to a boil. Twenty-five parts of 330 slack wax, and five parts of pentraerythritol dilanolate are charged to three parts of oleic acid, and five parts of Ektasolve EP. The mixture is heated to 190° F. (90° C.) with agitation. Two parts of morpholine are then added, and, after a few minutes a thickening is observed, indicating the neutralization reaction has proceeded. The heating is stopped, and the contents of the non-aqueous vessel are immediately transferred to the vessel containing the water with continuous stirring. Heating is then terminated and the mixture continuously agitated until it cools to 100° F. (38° C.). The pH is then adjusted to 8.5 by addition of less than one part of morpholine. About three parts of water are added to compensate for water lost during heating. The solids content is then found to be about 30%.

The resulting product is tested for corrosion resistance by applying to a cold rolled 1010 steel panel. After drying for 72 hours the test panel is subjected to a 5% salt (NaCl) spray at a temperature of 95° F. (35° C.) according to ASTM test B-117. The test panel resists failure (corrosion) for 500 hours.

A similar test panel coated with the formulation of this example I resists 2,000 hours of exposure to 100% relative humidity at 120° F. (44° C.) according to the techniques of ASTM D-2247.

A sample of the above formulation survives five successive freeze-thaw cycles each comprising 16 hours at 0° F. (−18° C.) followed by eight hours at 77° F. (25° C.) with no separation or other evident deleterious effect.

A sample of the above formulation withstands 144 hours at 120° F. (49° C.) without separation or other observable deleterious effect.

When a panel as previously described is dipped into the above formulation and allowed to dry at room temperature and approximately 50% relative humidity, the coating is cured and dry to the touch in 60 minutes.

The thickness on the above test panels is approximately 0.8 mil (approximately 20 microns or 0.20 millimeters).

Examples II–VIII

When various other formulations are produced and tested according to the parameters set forth in Table II, the results are as described in Table II and as set forth below:

Example II: This is a formulation produced according to techniques of Example I, except that 5.0% Ektasolve-EM is substituted for 5.0% Ektasolve-EP. This change results in a formulation of good film properties, as in Example I, but exhibits emulsion breakage at 120° F. after a short time (120 minutes).

Example III: This is a formulation produced according to techniques set forth above for Example I, except that the pentaerythritol dilanolate is doubled in amount and substituted for part of the slack wax. Also, this Example III formulation contains a defoamer, Surfynol 104A, manufactured by Air Products of Allentown, Pa. Also, 4% triethanol amine has been added in place of 2% morpholine.

This produces a formulation, the pH of which is too high. During formulation, as the emulsion cooled, it "burst" into two distinct phases, an oil phase and a water phase, and is not usable for coating purposes.

Example IV: This is a formulation produced according to techniques set forth above for Example I, except that 25% more pentaerythritol dilanolate (note: residual acid is #10, Sap. #170) is substituted for 25% slack wax, 8% butyl cellosolve is substituted for 5% Ektasolve-EP, and no oleic acid is present.

The film properties are similar to the best mode (Example I), but the cost is much greater.

Example V: This is a formulation produced according to techniques set forth above for Example I, except that 10% of the total 330 slack wax is replaced by 5% pentaerythritol dilanolate plus 5% Mobil Micro Wax, and the 5% Ektasolve-EP is replaced by 5% mineral spirits. This formulation had inferior emulsibility and poorer film properties, probably due to interactions of the components.

Example VI: This is a formulation produced according to techniques set forth above for Example V except that the 10% of 330 slack wax is replaced by 10% of Degras lanolin (residual acid #7–10). This formulation performed comparably to that of Example V.

Example VII: This is a formulation produced according to techniques set forth above for Example I, except that the 25% of 330 slack wax and 5% of the water is replaced by 20% Mobil Microwax and 10% pantaerythritol lanolate.

Example VIII: This is a formulation produced according to techniques set forth above for Example I, except that 3% of oleic acid is replaced by 3% of Stepan WHC. Processing and film properties, while acceptable, are inferior to the best mode. This is especially true water sensitivity of the film.

TABLE II

| EXAMPLE: | I | II | III | IV | V | VI | VII | VIII |
|---|---|---|---|---|---|---|---|---|
| RUN NUMBER: | 2-38 | 2-45 | 2-53 | 2-28 | 2-43 | 2-41 | 2-29 | 2-36 |
| Organic Wax | | | | | | | | |
| Mobil Microwax 2305 | | | | | 5.0 | 5.0 | 20.0 | 20.0 |
| 100 Pale Oil | | | | | | | | 10.0 |
| 330 Slack Wax (23% oil) | 25.0 | 25.0 | 20.0 | | 15.0 | 15.0 | | |
| Polyol Ester | | | | | | | | |
| Pentaerythritol Dilanolate | 5.0 | 5.0 | 10.0 | 30.0 | 10.0 | | 10.0 | |
| Degras Lanolin | | | | | | 10.0 | | |
| Water | | | | | | | | |
| $H_2O$ | 60.0 | 60.0 | 59.9 | 60.0 | 60.0 | 60.0 | 55.0 | 57.0 |
| Coupling Agent | | | | | | | | |
| mineral Spirits (R-66) | | | | | 5.0 | 5.0 | 10.0 | |
| Butyl Cellosolve | | | | 8.0 | | | | |
| Diglycerol Monooleate (A-300) | | | | | | | | 10.0 |
| Ektasolve-EP | 5.0 | | 5.0 | | | | | |
| Ektasolve-EM | | 5.0 | | | | | | |
| Amine | | | | | | | | |
| Morpholine | 2.0 | 2.0 | | 2.0 | 2.0 | 2.0 | 2.0 | 2.0 |
| Triethanol Amine (TEA) | | | 4.0 | | | | | 1.0 |
| Carboxylic Acid | | | | | | | | |
| Oleic Acid | 3.0 | 3.0 | 3.0 | | 3.0 | 3.0 | | |
| Surfactant | | | | | | | | |
| Stepan WHC Emulsifier | | | | | | | | 3.0 |
| Surfynol 104A | | | .1 | | | | | |
| Test Results | | | | | | | | |
| Emulsion Stability | Good | Good | pH too high | Good | Poor | Poor | Good | Emulsion broke upon cooling in reaction vessel |
| Storage Stability | Good | Poor | | | Poor | Poor | — | |
| Freeze-Thaw | Good | Good | Excess TEA Emulsion | | OK | OK | OK | |
| Viscosity | Good | Good | | | Heavy | Heavy | Heavy | |
| Film Integrity | Good | Good | | | Good | Good | Good | Good |
| Drytime | 1 hour | 1 hour | 2 hours | | 2 hours | 2 hours | 2-3 hrs | 2 hours |
| Hot $H_2O$ Removeability | Good | Good | | | Good | Poor | Fair | Poor |
| Early $H_2O$ Resistance | Good | Good | | | Good | Good | Good | Fair |
| Firmness | Semi-firm | Semi-firm | | | Firm | Firm | Firm | Firm |
| Salt Spray (ASTM B117) (In Hours): | | | | | | | | |
| Cold Rolled Steel (Bare) | 25% | | | | | | | |
| Carbon Steel (Polished) | 500 hrs. | 350 hrs. | 400 | | 400 hrs+ | 200 hrs | 200 hrs | 250 hrs |
| Thickness (mil) | .8 | | | | | | | |

TABLE II-continued

| EXAMPLE: | I | II | III | IV | V | VI | VII | VIII |
|---|---|---|---|---|---|---|---|---|
| RUN NUMBER: | 2-38 | 2-45 | 2-53 | 2-28 | 2-43 | 2-41 | 2-29 | 2-36 |
| Humidity, ASTM D-1748 21% corr | mil dry 2,000 hrs+ | 2,000 hrs+ | | | 2,000 hrs+ | 1,000 hrs | 1,000 hrs+ | 1,000 hrs+ |
| Weatherometer, ASTM G-23 Sprayability | Good | Good | | | Good | Fair | Fair | Fair |
| Comments | | Best made | Good except for storage | Alkalinity too high and emulsion broke | Good but too expensive | Not enough solvency for micro wax | Not enough solvency for micro wax | WHC imparts poor water resistance to dry film |

Modifications:

It will be understood by those skilled in the art that the invention is not to be restricted by the examples which merely illustrate the invention and that the invention is susceptible to a wide variety of modifications and variations without departing from the spirit thereof. For example, the formulations of the invention can be prepared as concentrates to which a substantial amount of water can be added in order to avoid shipping of water, particularly for international or other long distance shipment. The formulations may contain other useful ingredients such as biocides, antifoam agents, pigments, dyes and leveling agents, well known to those skilled in the coatings technology.

What is claimed is:

1. An anti-corrosive, storage stable, rapidly drying, emulsified oil in water and water reducible and dispersible coating composition, capable of application and flow on a solid substrate, comprising:
    (a) about 0.5 to 30% by weight of organic wax components having a melting point below 65° C.;
    (b) about 1 to 30% of a polyol ester derived from the polyester of one of:
        stearic acid, isostearic acid, oleic acid and lanolinic acids,
    and a polyol selected from the group consisting of:
        neopentyl glycol, trimethylol propane, pentaerythritol and dipentaerythritol;
    (c) about 0.5 to 5% of surfactant;
    (d) about 1 to 15% of a coupling agent selected from the group consisting of:
        mineral spirits, ethylene glycol ether, butyl cellosolve, sorbitan diethylene glycol monoethyl ether, ethylene glycol monopropyl ether, propyl cellosolve, ethyl cellosolve, diethylene glycol monoethyl ether, ethylene glycol monoacetate, diethylene glycol monopropionate, diethylene glycol monoacetate, propylene glycol monoacetate, ethanol, isopropanol and isobutanol; and
    (e) about 45 to 97% water.

2. A composition of claim 1, in which said coating further comprises about 2 to 8% of a carboxylic acid, and about 1 to 5% of an amine, said acid and said amine forming a salt providing at least a portion of said surfactant.

3. A composition of claim 2, in which said coating further comprises at least one of an emulsifiable amide and an organic sulfonate replacing part of said carboxylic acid and said amine.

4. A composition of claim 1, in which said wax is admixed with 10 to 50 weight percent, based on the weight of the wax, of a hydrocarbon oil.

5. A composition of claim 4, in which said hydrocarbon oil is an essentially saturated oil boiling above 177° C.

6. A composition of claim 1, which contains at least 50%, by weight, of essentially saturated wax.

7. A composition of claim 6, in which all or part of said essentially saturated wax is crystalline paraffinic wax.

8. A composition of claim 7, in which said crystalline paraffinic wax comprises one or more of the following: slack wax, petrolatum and micro-crystalline wax.

9. A composition of claim 1 in which said polyol ester is pentaerythritol dilanolate.

10. A composition of claim 2, in which said carboxylic acid possesses about 6 to 30 carbon atoms per carboxylic acid group.

11. A composition of claim 10, in which at least one of said carboxylic acids is chosen from the following: oleic acid, linoleic acid, isostearic acid and stearic acid.

12. A composition of claim 2, in which said amine is chosen from the following: morpholine, triethanolamine, ammonia, diethanolamine and ethanolamine.

13. A composition of claim 2, in which said coating further comprises at least one of oleyl diethanol amide and sorbitan mono-oleate.

14. A composition of claim 1, in which said coupling agent is an ether-alcohol chosen from the following: propyl cellosolve, butyl cellosolve, ethyl cellosolve and diethylene glycol monoethyl ether.

15. A composition of claim 14, in which said ether-alcohol is propyl cellosolve.

16. A composition of claim 1, in which the coupling agent is selected from the group consisting of: ethylene glycol monoacetate, diethylene glycol monopropionate, diethylene glycol monoacetate and propylene glycol monoacetate.

17. A method of producing an anti-corrosive, storage stable, rapidly drying, emulsified oil in water and water reducible and dispersible coating composition, capable of application and flow on a solid substrate, comprising the following steps:
    (a) mixing, in an essentially fluid state:
        a wax component,
        a polyol ester derived from the polyester of one of:
            stearic acid, isostearic acid, oleic acid and lanolinic acids,
        and a polyol selected from the group consisting of:
            neopentyl glycol, trimethylol propane, pentaerythritol and dipentaerythritol;
        carboxylic acid, and
        a coupling agent selected from the group consisting of: mineral spirits, ethylene glycol ether, butyl cellosolve, sorbitan diethylene glycol monoethyl ether, ethylene glycol monopropyl ether, propyl cellosolve, ethyl cellosolve, diethylene glycol monoethyl ether, ethylene glycol monoacetate, diethylene glycol monopropionate, diethylene glycol monoacetate, propylene glycol monoacetate ethanol, isopropanol and isobutanol, (b) adding an amount of amine sufficient to affect dispersibility of the mixture in water and to neutralize the carboxylic acid;

(c) adding water, with agitation, at such temperature so as to cause dispersion of the mixture; and (d) adjusting the pH of the total mixture from about 7 to about 10.

18. The method of producing a coating composition of claim 17, capable of high temperature, long term storage, wherein said coupling agent is propyl cellosolve.

19. A method of claim 17, in which part of said caarboxylic acid and amine are replaced by an emulsifiable amide or an organic sulfonate.

20. A method for coating solid substrates, wherein said composition of claim 1 is applied to metal.

21. A method for coating solid substrates, wherein said composition of claim 1 is applied by dipping.

22. A method for coating solid substrates, wherein said composition of claims 1 is applied by brushing.

23. A method for coating solid substrates, wherein said composition of claims 1 is applied by rolling.

24. A method for coating solid substrates, wherein said composition of claims 1 is applied by electrostatic spraying.

25. A method for coating solid substrates, wherein said composition of claims 1 is applied by hand spraying.

26. A composition of claim 2 in which at least a portion of said carboxylic acid is contained in said wax components.

27. A manufacture comprising a substrrate coated with a coating composition of claim 1.

28. A composition according to claim 1 comprising:
(a) about 5 to 25% of component (a);
(b) about 5 to 20% of component (b);
(c) about 3 to 5% of component (c);
(d) about 3 to 12% of component (d); and
(e) about 50 to 60% of component (e).

29. A composition according to claim 1 comprising:
(a) about 12 to 20% of component (a);
(b) about 8 to 12% of component (b);
(c) about 3 to 4% of component (c);
(d) about 4 to 10% of component (d); and
(e) about 50 to 60% of component (e).

30. An anti-corrosive, storage stable, rapidly drying emulsified oil in water and water reducible and dispersible coating composition, capable of application and flow on a solid substrate, comprising:
(a) 25% slack wax;
(b) 5% pentaerythritol dilanolate;
(c) 3% oleic acid;
(d) 5% propyl cellosolve;
(e) 2% morpholine; and
(f) 60% water.

31. The composition of claim 4 admixed with 15 to 35, and preferably 20 to 30, weight percent of hydrocarbon oil.

32. A composition of claim 1, wherein said organic wax components comprise oxygenated waxes having an acid number in the range of from 15 to about 200, and most preferably from 25 to about 45.

33. A composition of claim 1, wherein the pH is in the range of 7.0 to 10, and preferably 8.0 to 9.0.

34. An anti-corrosive, storage stable, rapidly drying, emulsified oil in water and water reducible and dispersible coating composition, capable of application and flow on a substrate comprising:
(a) about 0.5 to 30% by weight of organic wax components having a melting point below 60° C.;
(b) about 1 to 30% of polyol ester derived from the polyester of one of:
stearic acid, isostearic acid, oleic acid and lanolinic acids,
and a polyol selected from the group consisting of:
neopentyl, glycol, trimethylol propane, pentaerythritol and dipentaerythritol;
(c) about 2 to 8% carboxylic acid;
(d) about 1 to 15% of a coupling agent selected from the group consisting of: mineral spirits,
ethylene glycol ether, butyl cellosolve, sorbitan diethylene glycol monoethyl ether, ethylene glycol monopropyl ether, propyl cellosolve, ethyl cellosolve, diethylene glycol monoethyl ether, ethylene glycol monoacetate, diethylene glycol monopropionate, diethylene glycol monoacetate, propylene glycol monoacetate, ethanol, isopropanol and sorbitanol,
(e) about 1 to 5% amine; and
(f) about 45 to 97% water.

35. A method according to claim 17, wherein step (a) is conducted at about 90° C., the water at step (c) is boiling water, and step (d) is performed after the mixture has cooled to about 38° C.

36. A method of producing an anti-corrosive, storage stable, rapidly drying, emulsified oil in water and water reducible and dispersible coating composition, capable of application and flow on a solid substrate, comprising the following steps:
(a) mixing, in an essentially fluid state, 25% slack wax, 5% pentaerythritol dilanolate, 3% oleic acid, and 5% propyl cellosolve;
(b) adding 2% of morpholine with further mixing;
(c) adding 60% water with agitation, at such temperature so as to cause dispersion of the mixture; and
(d) adding less than 1% morpholine to adjust the pH to 8.0–8.5.

* * * * *